United States Patent [19]

Dehling

[11] Patent Number: 5,111,556
[45] Date of Patent: May 12, 1992

[54] ARRANGEMENT FOR CLOSING A CABLE SOCKET FOR CONNECTING AND BRANCHING CABLES, PARTICULARLY TELECOMMUNICATION CABLES

[75] Inventor: Helmut Dehling, Dorsten, Fed. Rep. of Germany

[73] Assignee: Stewing Kunststoffbetrieb GmbH, Dorsten, Fed. Rep. of Germany

[21] Appl. No.: 590,474

[22] Filed: Sep. 28, 1990

[30] Foreign Application Priority Data

Sep. 30, 1989 [DE] Fed. Rep. of Germany ....... 3932734
Dec. 14, 1989 [DE] Fed. Rep. of Germany ... 8914665[U]

[51] Int. Cl.$^5$ .............................................. F16L 33/12
[52] U.S. Cl. ............................................................ 24/270
[58] Field of Search ................ 24/16 PB, 68 R, 68 T, 24/68 CD, 270, 273, 483, 270, 19; 292/113, 256.69

[56] References Cited

U.S. PATENT DOCUMENTS

| 2,751,240 | 6/1956 | Claud-Mantle | 292/113 |
| 2,862,275 | 12/1958 | Kessler | 24/270 |
| 3,007,722 | 11/1961 | Anderson et al. | 24/270 X |
| 3,183,569 | 5/1965 | Webb et al. | 24/270 |
| 3,455,336 | 7/1969 | Ellis | 24/16 PB |
| 4,527,309 | 7/1985 | Kawahara | 24/68 CD |

FOREIGN PATENT DOCUMENTS 663925  8/1929  France ................................ 24/68 T Primary Examiner—James R. Brittain
Attorney, Agent, or Firm—Toren, McGeady & Associates

[57] ABSTRACT

An arrangement for closing a cable socket for connecting and branching cables, particularly telecommunication cables. The arrangement includes a longitudinally divided socket pipe and closing sections which each have an undercut and limit the longitudinal division. The arrangement also includes a closure which engages the undercuts and extends over the closing sections. The closure is a gripping closure which includes a cover member and a gripping stirrup, wherein the cover member has at one longitudinal side thereof a claw for engaging behind one of the closing sections. At the other longitudinal side of the cover member, the gripping stirrup is pivotally mounted and forms in the pivoted state a claw for engaging behind the other closing section. When the gripping stirrup is pivoted beyond a dead center position, the longitudinal edges of the socket pipe are pressed together.

7 Claims, 5 Drawing Sheets

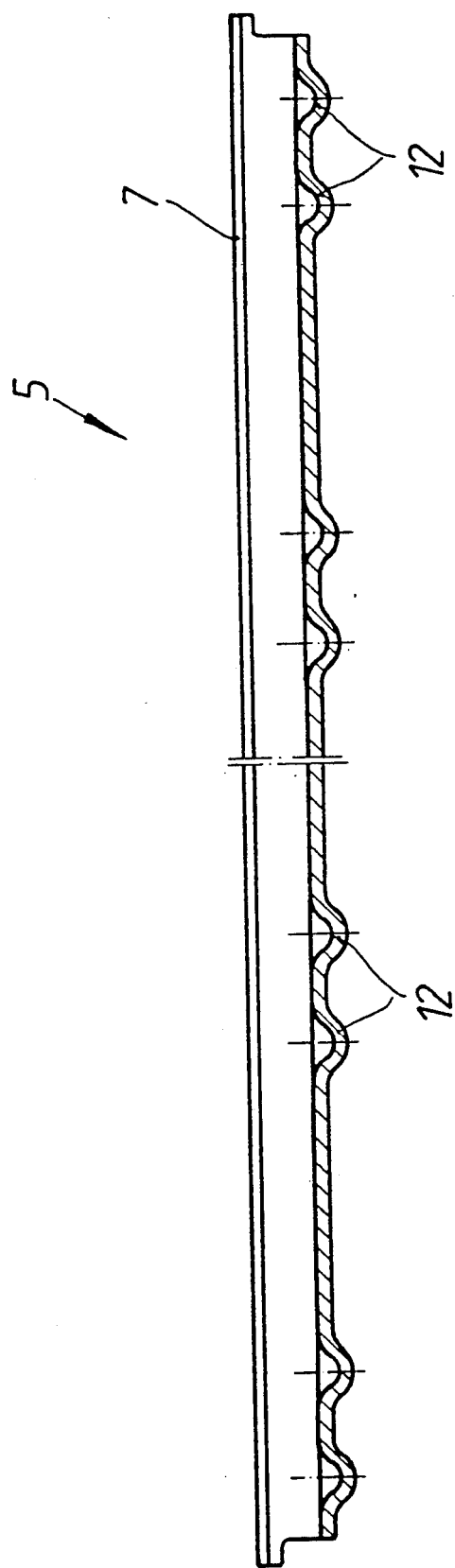

ARRANGEMENT FOR CLOSING A CABLE SOCKET FOR CONNECTING AND BRANCHING CABLES, PARTICULARLY TELECOMMUNICATION CABLES

BACKGROUND OF THE INVENTION

1. Field of the Invention

The present invention relates to an arrangement for closing a cable socket for connecting and branching cables, particularly telecommunication cables. The arrangement includes a longitudinally divided socket pipe and closing sections which each have an undercut and limit or border on the longitudinal division. The arrangement further includes a closure which engages in the undercuts and extends over the closing sections.

2. Description of the Related Art

Dovetail-like clamping rails with legs which extend conically toward each other are known in the art for closing longitudinally divided socket pipes. Such clamping rails are slid onto the closing sections which extend parallel to each other and border on the longitudinal division of the socket pipes. When the clamping rails are slid on from one side and from the other side of the socket pipe, the socket pipe is pulled together in the region of the longitudinal division because of the conically extending legs. Closing on the socket pipe is relatively cumbersome and difficult because the clamping rails are slid on manually, i.e., the clamping rails are slid on with one hand while the other hand tries to narrow as much as possible the longitudinal slot of the socket pipe which results from the longitudinal division. Moreover, the clamping rails which have been slid on must be tensioned axially relative to each other by means of a strap and tension lock in order to maintain the clamping rails in the assembled state. This arrangement is also cumbersome.

SUMMARY OF THE INVENTION

It is, therefore, the primary object of the present invention to provide an arrangement for closing a cable socket of the above-described type which can be quickly and simply assembled and which ensures a problem-free closure of the longitudinally divided socket pipe.

In accordance with the present invention, the closure is a gripping closure which includes a cover shell or cover member and gripping stirrup, wherein the cover member has at one longitudinal side thereof a claw for engaging behind one of the closing sections. At the other longitudinal side of the cover member, the gripping stirrup is pivotally mounted and forms in the pivoted state claw for engaging behind the other closing section. When the gripping stirrup is pivoted beyond a dead center position, the longitudinal edges of the socket pipe are pressed together.

Usually two gripping closures are used for closing a conventional cable socket. However, it is also possible to use several gripping closures next to each other.

The present invention starts from the finding that the longitudinally divided socket pipe of a cable socket can be particularly simply and quickly closed when a gripping closure is available which engages behind the two parallel closing sections of the longitudinal division and which can be actuated beyond a dead center position in such a way that the two longitudinal edges of the socket pipe are pulled toward each other as a closing tension is generated and are held together. A gripping closure which is tightened in this manner and which is actuated perpendicularly to the longitudinal direction of the socket pipe is fixed in axial direction due to its gripping effect on the closing sections over which the gripping closure engages. When a sealing agent is provided, the longitudinal division of the socket pipe is perfectly sealed.

In accordance with an important feature of the present invention, the cover member is of sheet steel and has stiffening corrugations or ribs. In accordance with the invention, the claw of the cover member is formed by bending its free longitudinal edge. A cover member of this type is relatively easy to manufacture.

In accordance with another feature of the invention, the cover member has in its longitudinal edge facing away from the claw a hinge bolt and recesses for the gripping stirrup, wherein the cover member and the gripping stirrup are pivotally connected to each other by means of a hinge. This makes it possible to easily tighten the gripping closure. In order to be able to move the gripping stirrup past a defined dead center position when tightening the grip closure, the cover member may have an angle portion which includes the hinge bolt and the recesses. As a result, the gripping stirrup is arranged offset relative to the cover member and the shape of the cover member is adapted to the outer circumference of the socket pipe.

In accordance with a further development of the invention, the gripping stirrup has in the region of the recesses pockets which extend perpendicularly to the axis of the hinge. The pockets serve for the insertion of an actuating tool. The pockets have bearings for the hinge bolt.

On the one hand, the gripping stirrup forms one of the claws of the gripping closure while, on the other hand, the clamping stirrup projects with its pockets beyond the cover member. In order to facilitate the putting together of the closing sections in the region of the longitudinal division when the socket pipe is closed and in order to facilitate loosening of the gripping closure, an actuating tool can be inserted in the pockets. Thus, by means of such an actuating tool, the lever action for the tightening procedure or the loosening procedure is substantially increased.

Another advantageous feature of the present invention provides that the gripping stirrup is of sheet steel and has hinge flanges which extend perpendicularly to the hinge axis. The hinge flanges define bearing recesses for the hinge bolt and receiving recesses for the actuating tool, the receiving recesses extending perpendicularly to the bearing recesses. Cover sheets are fastened on the hinge flanges in order to define the pockets and the bearing recesses and to supplement the receiving recesses. As a result, the gripping stirrup and the cover member can be economically manufactured in a simple manner from a blank of sheet steel.

The present invention provides the particular advantage that an arrangement for closing a cable socket for connecting and branching cables, particularly telecommunication cables, is obtained, wherein the arrangement is a gripping closure and, thus, the longitudinal edges of the longitudinally divided socket pipe are pulled together and held together with the generation of a clamping effect. Moreover, the gripping closure according to the invention can be assembled and disassembled in a particularly simple and quick manner. In sum, closing of the cable socket or of the longitudinally divided socket pipe is substantially simplified with the gripping closure according to the present invention.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 6 is a sectional view, taken along sectional line C-D of the cover member of FIG. 3.

DESCRIPTION OF THE PREFERRED EMBODIMENT

Figure 1:
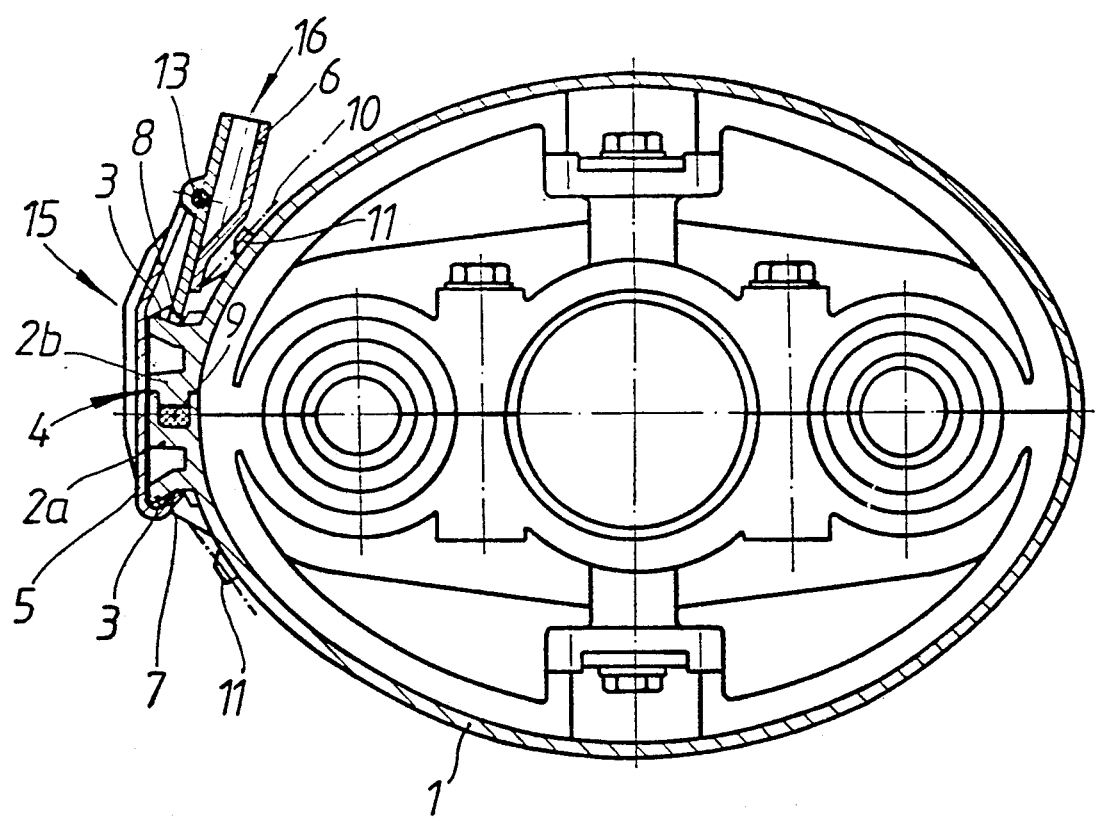
FIG. 1 is a vertical sectional view of the closed socket pipe of a cable socket with a gripping closure according to the present invention.
Figure 2:
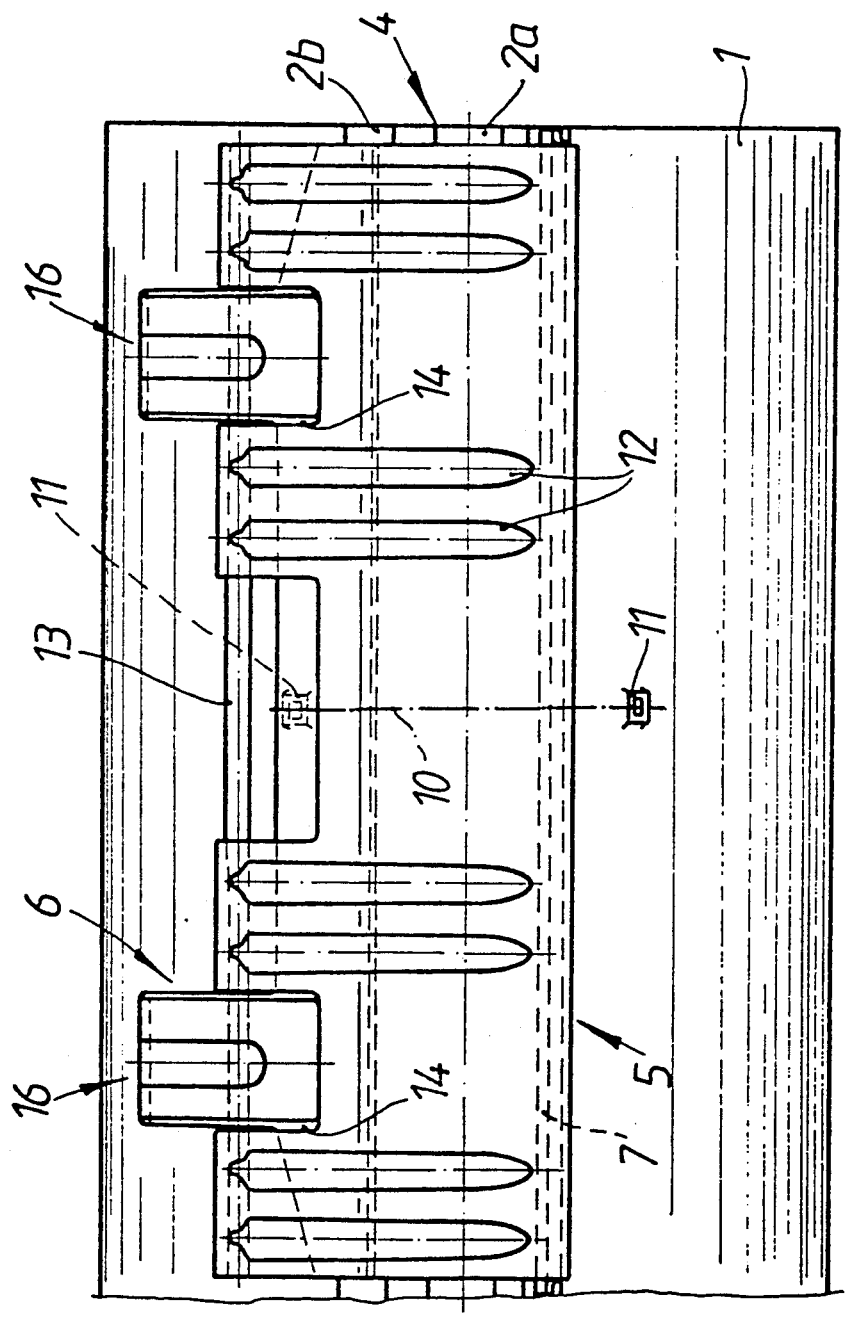
FIG. 2 is a side view of the arrangement of FIG. 1 with only one gripping closure.
Figure 3:
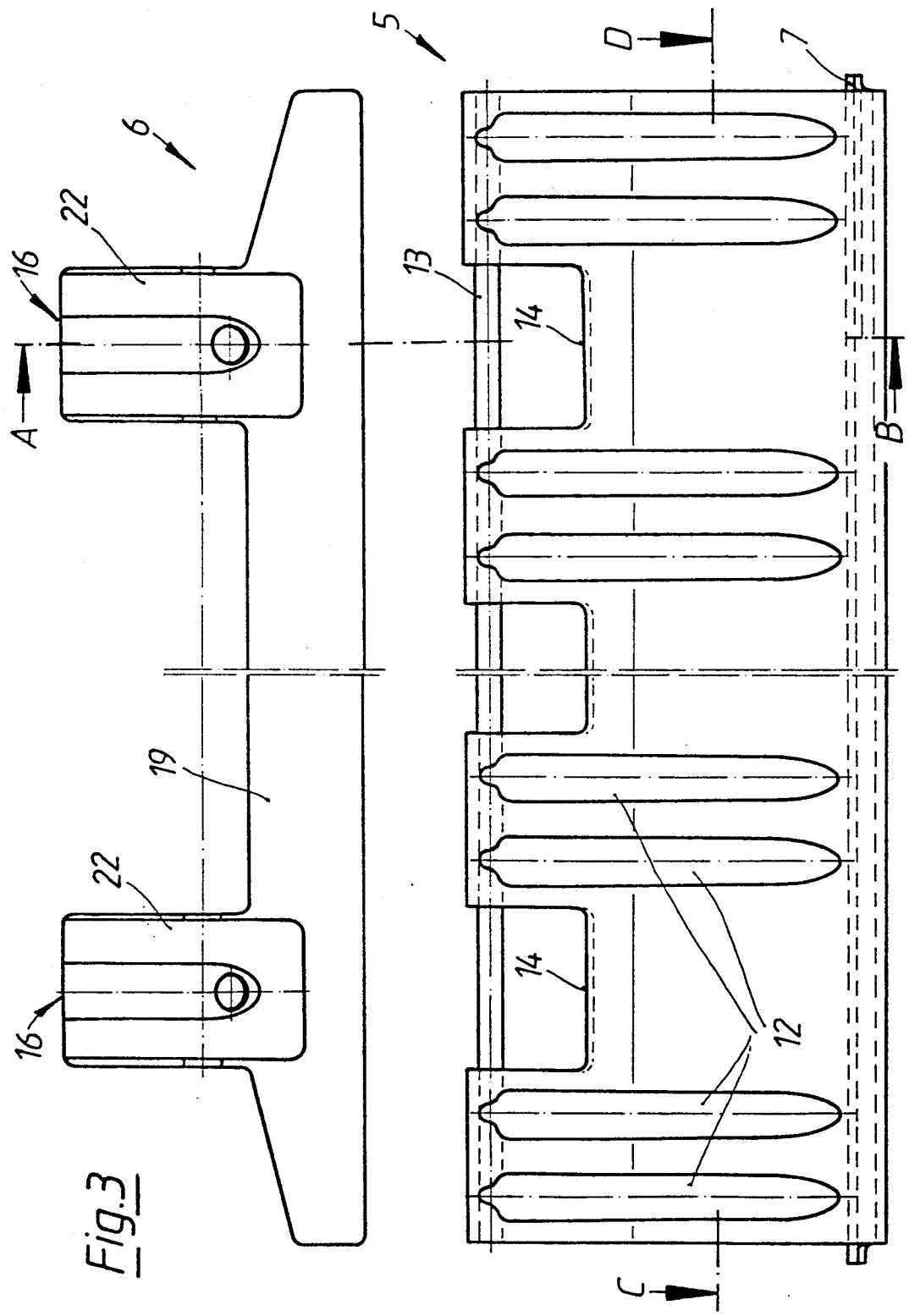
FIG. 3 is an exploded side view of the gripping closure according to the invention.
Figure 4:
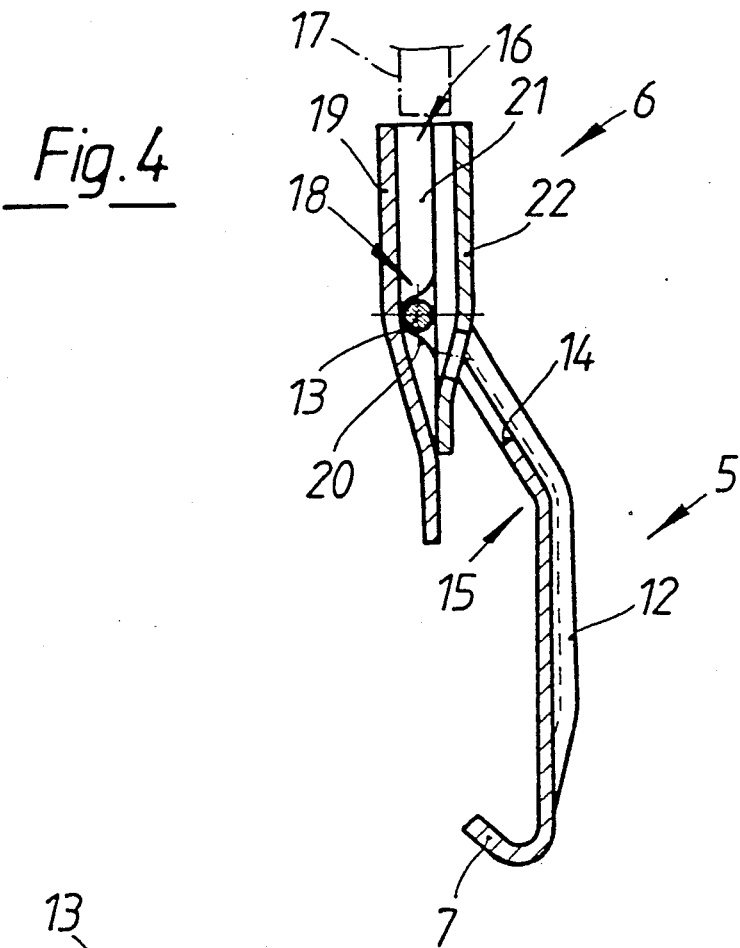
FIG. 4 is a sectional view, taken along sectional line A-B, of the arrangement of FIG. 1 in the assembled state.
Figure 5:
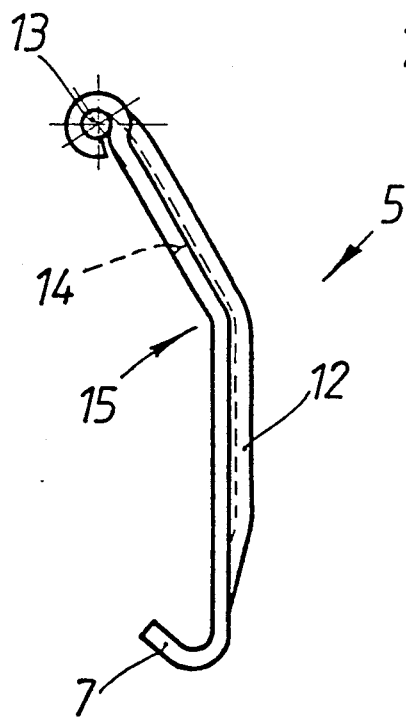
FIG. 5 is a side view of the cover member of the arrangement of FIG. 3.
Figure 7:
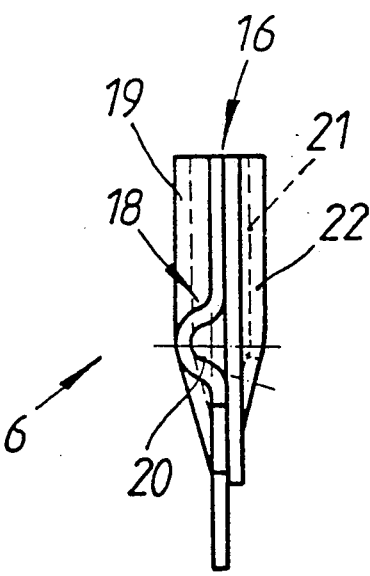
FIG. 7 is a side view of the gripping stirrup of FIG. 3.

The figures of the drawing show an arrangement for closing a cable socket for connecting and branching cables, particularly telecommunication cables. The cable socket includes a longitudinally divided socket pipe 1 of bending-elastic or thermoplastic material. The longitudinal division is bordered by closing sections 2a, 2b which each have an undercut 3. The longitudinal edges 4 of the socket pipe 1 resulting from the longitudinal division are held together in a closed position by means of a closure which engages in the undercut 3 and extends over the closing sections 2.

The closure is constructed as a gripping closure with a cover member 5 and a gripping stirrup 6. The cover member 5 has at a longitudinal side thereof a claw 7 for engaging behind one of the closing sections 2a, while the gripping stirrup 6 is pivotally mounted on the other longitudinal side. In the pivoted state, the gripping stirrup 6 forms a claw 8 for engaging behind the other closing section 2b. When the gripping stirrup 6 is pivoted beyond a dead center position, the longitudinal edges 4 of the socket pipe 1 are pressed together and the longitudinal division of the socket pipe 1 is perfectly sealed with the intermediate arrangement of a sealing material 9. In the tensioned state, the gripping closure 5, 6 can be additionally secured against unintentional opening, for example, by means of a securing means 10 which can be connected to the gripping closure 5, 6, on the one hand, and to support cams 11 on the outer circumference of the socket pipe 1, on the other.

The cover member 5 is of sheet steel and has stiffening corrugations 12. The claw 7 of the cover member 5 is formed by bending its free longitudinal edge. On its longitudinal edge facing away from the claw 7, the cover member 5 has a hinge bolt 13 and recesses 14 for the gripping stirrup 6 which is pivotally connected by forming a hinge. In addition, the cover member 5 has an angle portion 15 with the hinge bolt 13 and the recesses 14 in order to adjust the shape of the cover member 5 to the outer circumference of the socket pipe 1 in the region of the longitudinal division thereof.

The gripping stirrup 6 has in the region of the recesses 14 pockets 16 which extend perpendicularly to the axis of the hinge. The pockets 16 serve for the insertion of an actuating tool 17. The pockets 16 have bearings 18 for the hinge bolt 13. The gripping stirrup 6 is also of sheet steel. However, the gripping stirrup 6 has hinge flanges 19 which extend perpendicularly to the hinge axis and which have bearing recesses 20 for the hinge bolt 13 and receiving recesses 21 for the actuating tool 17, wherein the receiving recesses 21 extend perpendicularly to the bearing recesses 20. Cover sheets 22 are fastened on the hinge flanges 19 for forming the pockets 16 and limiting or forming the bearing recesses 20 and for supplementing the receiving recesses 21.

While a specific embodiment of the invention has been shown and described in detail to illustrate the application of the inventive principle, it will be understood that the invention may be embodied otherwise without departing from such principles.

I claim:

1. In an arrangement for closing a cable socket for connecting and branching cables, particularly telecommunication cables, the arrangement including a socket pipe longitudinally divided along longitudinal edges, and first and second closing sections bordering on the longitudinal edges, each closing section having an undercut, and a gripping closure which engages in the undercuts and extends over the closing sections, the gripping closure including a gripping member and a gripping stirrup, the gripping member engaging behind the first closing section, the gripping stirrup being pivotally mounted on the gripping member and forming in a pivoted position a claw for engaging behind the second closing section, the improvement comprising the gripping member being a cover member having two longitudinal sides, the cover member having another claw for engaging behind the first closing section, wherein, when the gripping stirrup is pivoted beyond a dead center position, the longitudinal edges of the socket pipe are pressed together and the cover member extends over the longitudinal edges of the socket pipe.

2. The arrangement according to claim 1, wherein the cover member is of sheet steel and includes stiffening corrugations or ribs.

3. The arrangement according to claim 1, wherein the cover member has a free longitudinal edge, the claw of the cover member being formed by bending the free longitudinal edge.

4. The arrangement according to claim 1, wherein the cover member has on a longitudinal side facing away from the claw a hinge bolt and recesses for the gripping stirrup, the gripping stirrup being pivotally connected and forming a hinge.

5. The arrangement according to claim 4, wherein the cover member has an angled portion with the hinge bolt and the recesses.

6. The arrangement according to claim 4, wherein the gripping stirrup has in the region of the recesses pockets which extend perpendicularly to the axis of the hinge, the pockets serving for the insertion of an actuating tool, the pockets having bearings for the hinge bolt.

7. The arrangement according to claim 6, wherein the gripping stirrup is of sheet steel and has hinge flanges which extend perpendicularly to the hinge axis, the hinge flanges defining bearing recesses for the hinge bolt and receiving recesses for the actuating tool, wherein the receiving recesses extend perpendicularly to the bearing recesses, wherein cover sheets are fastened on the hinge flanges to form the pockets and to limit the bearing recesses and supplement the receiving recesses.

* * * * *